Jan. 3, 1939.  W. W. CRILEY  2,142,114
INTEGRAL HAMMER FRAME AND ADJUSTABLE RAM GUIDES
Filed July 17, 1936  2 Sheets-Sheet 1

INVENTOR.
WILLIAM W. CRILEY
BY
ATTORNEY.

Jan. 3, 1939. W. W. CRILEY 2,142,114
INTEGRAL HAMMER FRAME AND ADJUSTABLE RAM GUIDES
Filed July 17, 1936 2 Sheets-Sheet 2

INVENTOR.
WILLIAM W. CRILEY
BY
ATTORNEY.

Patented Jan. 3, 1939

2,142,114

UNITED STATES PATENT OFFICE 2,142,114

INTEGRAL HAMMER FRAME AND ADJUSTABLE RAM GUIDES

William W. Criley, Cleveland, Ohio

Application July 17, 1936, Serial No. 91,215

5 Claims. (Cl. 78—29)

This invention relates to an improvement in power operated hammers, such as drop hammers, steam or pneumatically driven hammers, and the like, and more specifically is directed to a one-piece frame construction in combination with laterally adjustable ram guides mounted in the frame columns.

I propose, by this invention, to provide a much more rigid frame construction and also to greatly reduce the cost of frames in such machines, and furthermore facilitate and simplify the ram guide adjusting operation.

For purposes of illustration, an embodiment of the invention will be described in connection with drop hammers, its use, however, in connection with other types of hammers being readily apparent from the illustrated example.

Heretofore, drop hammer frames have been comprised of a number of separate members, such as an anvil or base, upright columns, and a head or tie member across the top of the columns, all of which were joined together by means of bolts. The principal objection to frames of this construction has been that the joints and the bolts which hold these members together are a continuous source of weakness. The repeated impacts of the ram on the anvil are sufficient to cause slight lateral movement of the columns relative to the base member and head member, which results in corresponding relative shifting of the die elements, thus producing inaccurate drop forging pieces.

In such frames, the machining of the tops and bottoms of the columns, the top of the base, and also the head plate or tie member entails considerable expense in each machine. These machined surfaces must be accurately made, which requires considerable machining time.

Furthermore, it is quite customary to provide means at the joints between the columns and the base for adjusting the columns laterally to properly align the dies, which further increases the expense of manufacture and maintenance.

The ram guides for machines having separate columns have been formed integral with the columns so that adjustment of the guides had to be made by shifting the entire columns relative to the anvil or base, which is usually a long and laborious operation if an accurate adjustment thereof is to be obtained. Oftentimes the spaces between the abutting surfaces of the columns and the base and clearance spaces provided for adjustment of the columns and base became filled with scale and dust, which is a further hindrance to adjustment of columns for effecting proper positioning of the guides.

In other machines the guides have been mounted separately in the columns and have been laterally adjustable by means of horizontal wedges, one near the top and one near the bottom of each guide. In order to adjust these guides, it was necessary for the workman to work from a ladder in order to adjust the top wedges and then step down on the floor to adjust the lower wedges a corresponding amount.

In still other machines, a single vertical adjusting wedge has been provided behind each of the guides. These wedges are adjustable through the medium of bolts located at the top ends of the columns. Here also such an adjustment had to be made from a ladder.

Through the use of my ram guide adjusting means, an accurate adjustment of the dies can be quickly obtained from a single location on the frame which is accessible to the workman from the floor level. While this guide adjusting feature is shown in conjunction with the integral frame construction, it is equally applicable to frames of the usual fabricated or built-up type.

In drop hammers, a tapered key customarily is used to constrain the die holder from shifting on the base during the heavy impact pressures delivered by the ram. Prior frame structures, wherein the columns are separate members secured to the base, utilize the base alone to resist these excessive lateral impact pressures. The base of such a structure is, in effect, an open C clamp with respect to the die holder and key. As a result, the pressure is so concentrated as to spread apart the free clamping portions of the base, this spreading tendency being followed, in time, by permanent deformation and fracture.

The present invention, however, is designed to eliminate these and other difficulties in drop hammers and other such machines, an important object being to provide a power operated hammer having an integral frame with the base, columns, and head member included in a single rigid casting.

Another object is to eliminate the weakness of the present open C clamp types of frames by virtue of the integral frame construction in which the base, columns and head or tie portions cooperate to form a closed integral frame which not only distributes the impact pressures, but also in which the portions mutually reinforce each other to withstand concentrations of impact forces thereof, spreading at the tie holding portion, and resultant fractures.

Still another object is to provide adjustable guides on the adjacent faces of the columns, each guide being conveniently and readily adjusted from a single point accessible to the workman from the floor level.

An equally important object is to provide means for effecting and maintaining adjustment of the entire guide surface of each guide while constraining the surface to parallelism with the path of the ram.

Other objects include the simplification of assembling and installing the ram in the frame and the facilitation of the adjustment of the dies after installation of the ram.

Other objects will become apparent from the following specification wherein reference is made to the accompanying drawings, in which.

Figure 1:
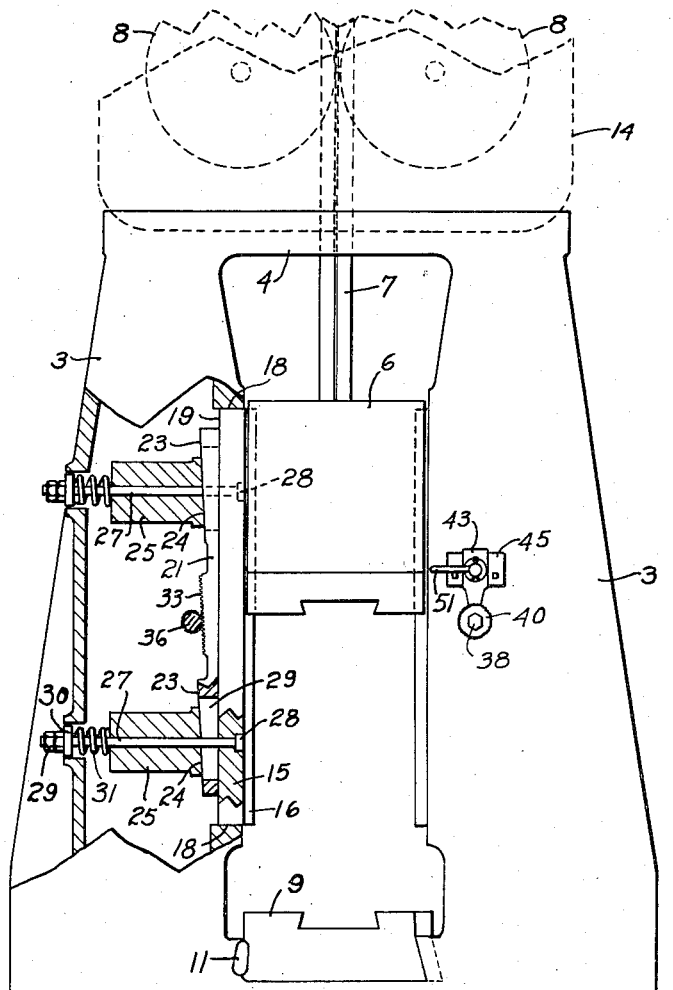
Fig. 1 is a front elevation of a drop hammer frame, the parts being broken away to show the embodiment of my invention.
Figure 2:
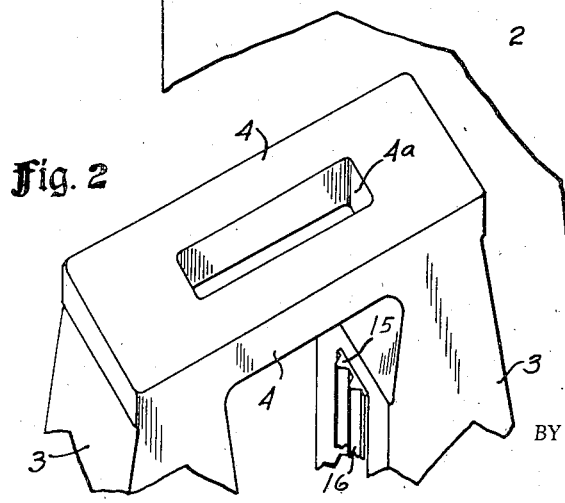
Fig. 2 is a fragmentary perspective view of the upper end of the drop hammer frame showing the integral connection of the columns with the transverse head or tie members.

Referring to Figs. 1 and 2, for purposes of illustration, the present invention is disclosed as embodied in a drop hammer, the embodiment thereof in steam hammers, pneumatic hammers and the like being readily apparent therefrom.

In the illustrative embodiment, a frame 1 is provided, the frame comprising a base or anvil 2, laterally spaced vertical columns 3, spanned at their upper ends by a horizontal head member or tie member 4, all of which are cast as a single, rigid and integral steel structure.

The adjacent faces of the columns 3 define, with the base 2, and tie member 4, a vertical and substantially rectangular opening in which a ram 6 is adapted to be reciprocated vertically by suitable means. In the form illustrated, a central opening 4ᵃ is provided in the head member 4, as shown in Fig. 2. Rigidly secured to the ram and projecting vertically therefrom and through the opening 4ᵃ of the head member 4 is a lift board or rod 7 which is intermittently engaged and released by power-driven friction lift rolls, indicated at 8, thus providing a means for reciprocating the ram.

Prior to this invention, in machines having columns separate from the base, it was necessary to accurately machine the upper faces of the base and the lower ends of each of the column members to form accurately abutting surfaces which would permit limited relative movement between the columns and the base to obtain necessary lateral adjustment between the columns. These members, as above stated, were secured together by means of heavy retaining bolts.

By providing the frame with the base and columns integral, this expensive and time-consuming machining operation is eliminated, with the added advantage of assuring an absolutely fixed and accurately spaced and properly aligned relation between the columns at all times. Moreover, such a frame eliminates the expensive and inefficient means employed by earlier machines for adjusting the columns and guides laterally relative to the base.

I have found by experience that in power operated hammer frames constructed of separate members, the columns cannot be rigidly held fixed in their original adjusted position for any length of time due to the heavy impacts or shocks of the ram on the anvil during operation of the hammer. These columns inherently shift during the impact, causing momentary spreading of the columns and consequent disalignment of the two die members and the resultant forming of inaccurate and inconsistent work pieces.

In order to satisfy the present requirements for higher precision forgings, absolute alignment of the dies under the heavy impacts from the ram must be provided.

At the lower end of the rectangular opening between the columns 3 is a stationary die holder 9 which is adjustably secured in position between the columns by a tapered key 11 interposed between one of the columns and the adjacent face of the die holder so that the adjacent faces of the columns operatively abut the die holder through the medium of the key and constrain the die holder to proper operating position and prevent shifting of the holder under the heavy blows delivered by the ram. As mentioned in the objects, a very important advantage is obtained by this construction. Instead of the usual open C clamp type of base supporting the die holder, the die holder 9 is supported within a rigid integral closed frame, the columns which operatively abut and hold the die holder being, in turn, integrally secured together by the header member or tie member 4. Thus, not only are the impact forces more uniformly distributed and partially absorbed in the entire frame, but such forces as are concentrated directly at the base of the columns are more effectively resisted. Consequently, the outward deflection or displacement of the columns which embrace the die holder and guide the ram is eliminated, as also are the resultant dangers of fracture in the base proper. Since the columns are thus integrally connected with the base and in turn are connected at their upper ends, the ram is constrained by the columns to accurate alignment with the die holder 9 or its associate die, and the die holder is retained in an accurate adjusted position at all times on the base.

Here it should be noted that one of the points of greatest stress in hammers of this character is in the anvil base adjacent the die holder. The die holder 9 is held in place in a suitable recess in the anvil base by the interposition of a very slightly tapered key 11 between the die holder and the wall of the recess. This key is initially driven into place by a heavy battering ram, thus creating an initial stress in the anvil. This stress, co-existent with the terrific impacts of the ram, often results in fracture of the base itself. In the integral frame, this stress is so distributed and absorbed that the chances of fracture are substantially eliminated. Again, especially in the fabricated types of frame, the base tends to elongate transversely under the impacts of the ram due to elastic deformation. For some reason, the tapered key, such as the key 11, thereupon creeps more deeply between the die holder and base at each temporary elongation of the latter, with the result that tremendous bending moments are created in the base about a neutral axis disposed substantially midway between the die holder and the bottom surface of the base. As a result, about half of the base resists compression stresses and only about half is available for withstanding tension. If this movement of the key is not arrested promptly, the impact stresses, coupled with the bending moments, fracture the base diagonally downwardly from juncture of the walls of the die holding recess. With the integral frame, however, these stresses are transformed entirely into tension, and the whole base and frame are available for withstanding such stresses. Consequently, the tension stresses are more widely distributed and absorbed throughout the massive frame structure.

Another decided advantage resides in the fact that the machining of the various portions of the frame, heretofore necessary for forming accurate abutting surfaces between the frame parts, is eliminated.

The spaces inherently existing between the abutting surfaces of the columns and the base in fabricated frames became filled with scale from the forging blanks and with dirt particles, both of which made it difficult to shift the columns relative to the base when adjustment of the ram guides by shifting the columns became necessary. By the use of my integral frame construction, these difficulties and objections also have been overcome. The columns being integral with the base, the precise relative positions thereof are positively maintained during the heavy impacts of the ram and the formation of consistent and accurate forgings is assured.

It is customary in earlier machines, in order to prevent spreading at the top of the columns, to provide a head frame or tie plate having interlocking machined surfaces fitted into complementary machined surfaces on the tops of the columns. This machine operation has also been eliminated by my present invention. The only machining necessary on the top of the present integral frame is a simple cut to provide a surface for the purpose of engaging and supporting the head frame 14 which carries the frictional lift rolls 8.

In machines having an integral frame, it is necessary to provide means for guiding the ram along its path of reciprocation and to effect adjustment of the ram laterally for aligning it properly with respect to the stationary die carried by the die holder 9. For these purposes, guide members 15 having generally V-shaped surfaces 16 which engage cooperating surfaces in the lateral faces of the ram 6 are provided. These guides 15 are fitted into suitable machined slots 17 in the adjacent faces of the columns 3 and are constrained to move transversely of the path of reciprocation of the ram by means of short horizontal guide surfaces 18 machined in the upper and lower ends of the slots 17.

In order to move the guide members 15 transversely of the path of the ram, while maintaining them in parallelism with the path of the ram, suitable guide adjusting means are operatively interposed between each guide member 15 and its associated columns.

In the form illustrated, the guide adjusting means include a slide surface 19 formed on each guide member 15 opposite to the guiding surface 16 thereof. The slide surface 19 of each guide is engaged by a cooperating slide surface on a wedge bar 21. On the opposite face of the wedge bar, adjacent the ends are surfaces 23 which are in abutting relation with cooperating surfaces of suitable abutment lugs 25 respectively, the lugs 25 preferably being integral with the associated column 3.

In order to effect wedging cooperation of the wedge bars 21 consequent upon endwise movement thereof, the operating surfaces at one or both faces of the wedge bars are wedge surfaces and engage complementary wedge surfaces on either the column abutment lugs 25, or the associated guide member 15, or both. In the form shown by way of illustration, the surfaces 23 of the wedge bar 21 are the wedge surfaces which cooperate with complementary wedge surfaces on the lugs 25 for effecting the wedging action to adjust the guides. In such an instance, wherein the wedging action is provided only between one face of the bar 21 and the associated column 3, the surface 19 on the associated guide member 15 and the cooperating surface of the wedge bar 21, are preferably flat and parallel to the guide surface of the guide member 15 and substantially coextensive therewith longitudinally of the path of the ram. Consequently, the guide members 15 are buttressed by the integral columns 3 through the medium of the wedge bars 21 and thereby guide the ram accurately into proper relation to the stationary die of the machine.

The engaging surfaces of the guide 15, the wedge bar 21, and lugs 25 are resiliently held in pressure engagement by means of bolts 27 which are secured to guides 15 by heads 28 and which pass through slotted openings 29 in the wedge bar 21 and through suitable openings in the lugs 25. The outer ends of the bolts 27 are provided with lock nuts 29 and washers 30. Compression springs 31 surround the bolts 27 and react between the lug 25 and the washers 30 to resiliently hold the guides 15, the wedge bar 21, and the lugs 25 in pressure engagement.

Figure 4:
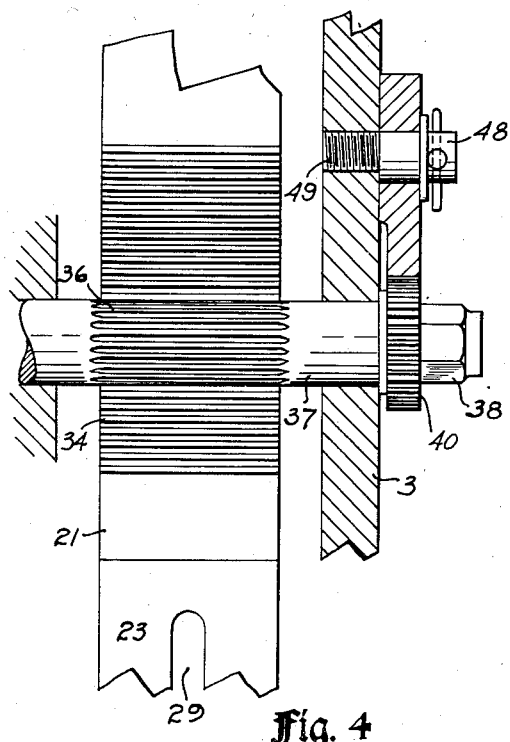
Fig. 4 is a fragmentary vertical sectional view taken substantially along the plane indicated by the line 4—4 of Fig. 3.
Figure 3:
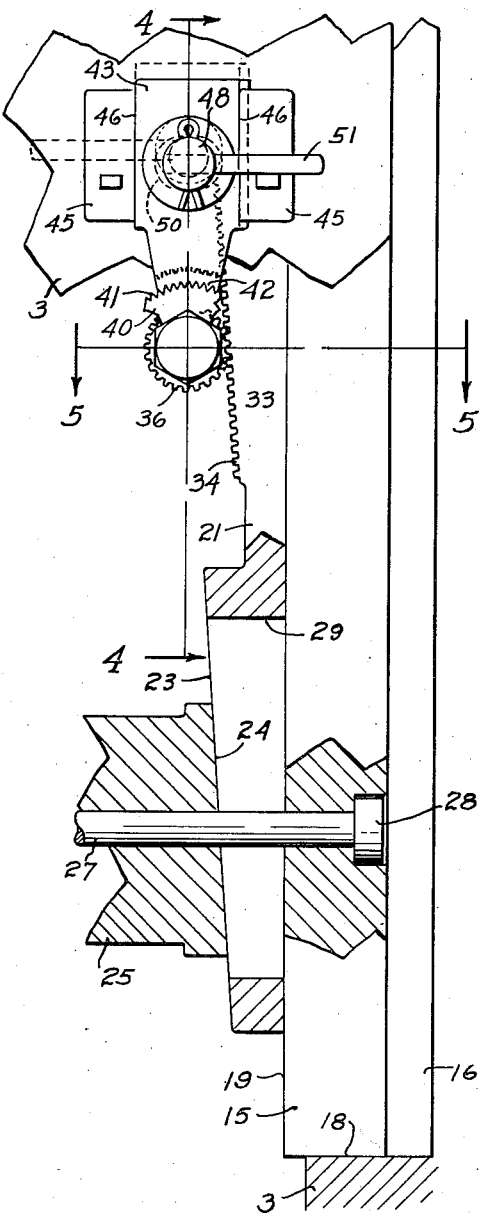
Fig. 3 is an enlarged fragmentary view, partly in section, showing the ram guide adjusting mechanism.
Figure 5:
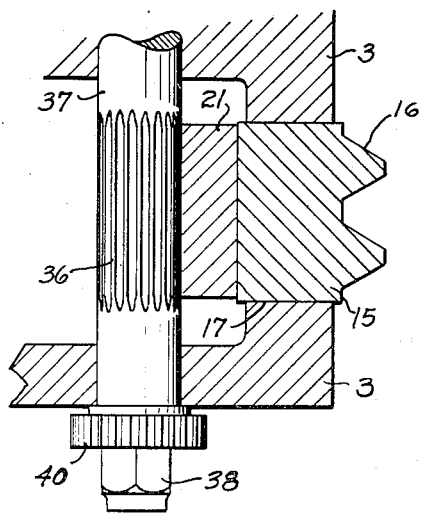
Fig. 5 is a fragmentary horizontal sectional view taken substantially on the plane indicated by the line 5—5 of Fig. 3.

Between the inclined surfaces 23 on the wedge bar 21 is a rack portion 33 having teeth 34 which are cut along a pitch line parallel to the surfaces 23. Meshing with the teeth 34 is a pinion 36 which is rigid with a horizontal shaft 37 which is journaled to the front and rear faces of the column 3, as shown in Fig. 4. On the outer end of the shaft 37 is provided a portion 38 for receiving a wrench to facilitate rotation of the shaft 37 and the pinion 36 whereby to cause vertical movement of the wedge bar 21 and consequent horizontal movement of the guide member 15.

The location of the shaft 37 is preferably such that it is readily accessible to the workman from floor level and provides for adjustment of the guide member from a single source. Such an arrangement offers obvious advantages over the earlier method of guide adjustment which, as stated before, required the use of a ladder or other such means for access and also a number of separate adjustment sources.

It will be noted from Fig. 1 that by reason of the inclined cooperating surfaces on the wedge bar and the integral lugs 25, the entire guide 15 may be moved bodily horizontally or transversely of the path of the ram while constrained to parallelism therewith, which insures the maintaining of a uniform clearance between the guide and the ram in all positions of the ram along its path of travel.

In erecting a drop hammer of this type, it is a simple matter to assemble the ram in the guideways. The ram is placed in the rectangular opening between the columns 3 and is held in an elevated position so that its bottom face is above the slots 17 with its upper end possibly extending into the opening 4a in the horizontal head or tie member 4. The guides 15 are then roughly positioned by movement of the wedge bars 21 so that the ram may be lowered into engagement with the guide surfaces 16. Then by rotating the pinion 36 and the consequent movement of the rack 33, the wedge bar 21 is caused to urged the guide 15 outwardly into proper guiding relationship with the sliding surfaces of the ram.

By providing such a guide adjusting means between each column 3 and its asociated guide member 15, an accurate, uniform, and rapid adjustment of the ram 6 transversely of its path of travel and relative to the die on the stationary die holder 9, can be obtained.

When the guides are brought to adjusted position, they may be positively locked therein by means of a disk 40 preferably rigid with the shaft 37 and positioned slightly inwardly from the wrench receiving portion 38. The peripheral surface of the disk 40 may be provided with serrations or teeth 41 which are engageable with interlocking teeth or serrations 42 on one end of a slidable plate 43. The plate 43 is constrained to move radially with respect to the center of the shaft 37 by means of spaced lugs 45 on the associate column 3, which lugs have guideways 46 formed on the inner faces thereof and engaging the sides of the plate 43. The plate 43 is shown movable by means of an eccentric pin 48 rotatably mounted, as by a threaded portion 49, in the column 3. The eccentric pin is accommodated in a slotted opening 50 in the plate 43 so that rotation of the eccentric pin by a handle 51 causes vertical movement of the plate 43 and consequent interengagement of the teeth 42 and 41, thus preventing subsequent rotation of the shaft 37.

From the foregoing description, it will be seen that I have provided an improved hammer which eliminates many of the disadvantages inherent in earlier machines, and in so providing, have accomplished the objects set forth.

While I have shown one modification of my invention, I do not wish to be strictly limited thereto, since it may be apparent to those skilled in the art that other modifications may be conceived without departing from the spirit and scope of the invention as defined in the hereunto annexed claims.

Having thus described my invention, what I claim is:

1. In an apparatus of the character described including a reciprocating ram, spaced frame members extending longitudinally of the path of the ram and accommodating the ram therebetween for reciprocation, ram guides mounted in the frame members for adjustment transversely of the path of the ram, wedge means for each guide comprising a movable wedge bar member interposed between each guide and its associated frame member and in wedging cooperation therewith for moving the guide toward the bar of the ram when the wedge bar member is moved along a given path, a rack carried by one of said members and extending longitudinally of the path of movement of the wedge bar member, a pinion carried by the other of said members and in cooperation with the rack for relative movement therealong, means for rotating the pinion whereby the wedge bar member is moved along its path, and manually operable means for latching the pinion and rack against relative movement thereby constraining the wedge bar in adjusted position, and resilient means yieldably urging the guide in a direction away from the path of the ram.

2. In an apparatus of the character described including a reciprocating ram, spaced frame members extending longitudinally of the path of the ram and accommodating the ram therebetween for reciprocation, ram guides mounted in the frame members for adjustment transversely of the path of the ram, wedge means for each guide comprising a movable wedge bar member interposed between each guide and its associated frame member and in wedging cooperation therewith for moving the guide when the wedge bar member is moved along a given path, a rack carried by one of said members and extending longitudinally of the path of movement of the wedge bare member, a pinion carried by the other of said members and in cooperation with the rack for relative movement therealong, means for rotating the pinion whereby the wedge bar member is moved along its path, a rotary toothed element rigid with the pinion, and having a relatively large number of closely spaced teeth, and detent means having a relatively large number of teeth concurrently engageable with a plurality of teeth on the toothed element and carried by and anchored to the pinion carrying member and engageable with the teeth of the element for latching the pinion.

3. In an apparatus of the character described including a reciprocating ram, a base for receiving a work piece and accessible for insertion of the work piece by an operator on a given working floor level, upright spaced frame members extending longitudinally of the path of the ram and accommodating the ram therebetween for reciprocation, upright ram guides mounted in the frame members for relatively free adjustable movement at all times along a horizontal lineal path transversely of the path of the ram, wedge means for each guide, each comprising a vertically movable wedge bar member interposed between each guide and its associated frame member, said wedge bar member, the associated column, and the associated guide having complementary sliding surfaces, whereby, upon vertical movement of the wedge bar member in one direction, it moves the associated guide toward the path of the ram, a horizontal pinion rotatably mounted in the frame member, a rack carried by the wedge bar member and extending longitudinally thereof, and said rack being engaged by the pinion, means accessible and operable by the operator from said floor level for rotating the pinion for moving the wedge bar, and means operable by the operator from said floor level for latching the pinion, and resilient return means normally urging the guides relatively apart from each other and into firm juxtaposition with the associated wedge bar member.

4. In an apparatus of the character described including a reciprocating ram, spaced frame members extending longitudinally of the path of the ram and accommodating the ram therebetween for reciprocation, ram guides mounted in the frame members for adjustment transversely of the path of the ram, wedge means for each guide comprising a movable wedge bar member interposed between each guide and its associated frame member and in wedging cooperation therewith for moving the guide when the wedge bar member is moved along a given path, a rack carried by the wedge bar member, a pinion rotatably mounted in the frame member and in operative engagement with the rack for moving the rack and for constraining the same against movement, selectively, a toothed element fixedly mounted on the pinion and rotatable therewith, said column having a rigid guide extending generally radially of the pinion, a detent member slidable along the guide and constrained thereby from rotation and engageable with the toothed element for latching the pinion against rotation thereby restraining the rack and wedge bar member from movement and the guide from displacement outwardly from the path of the ram.

5. An upright forging hammer comprising a generally rectangular closed frame including a base, laterally spaced upright columns integral with the base, and a horizontal head member integral with the columns and spaced vertically from the base, a stationary forming die mounted on the base between the columns for access by a workman for inserting and removing a work piece from a working floor level in front of the frame, a ram movable vertically between the columns, a complementary forming die on the ram mating with the stationary die, a lift member attached to the ram, power driven means carried by the frame and operative for reciprocating the ram, horizontally adjustable ram guides in the columns, respectively, said ram guides being adjustable laterally of the frame independently of each other for providing both for proper running fit of the ram therewith and for aligning the ram to provide accurate mating of the dies, said guides having sliding surfaces on the ends and sides, said columns having cooperating sliding surfaces which cooperate with the sliding surfaces of the guides, said columns having reactance surfaces, wedge means respective to the guides for moving the guides horizontally to different adjusted positions and interposed between the reactance surfaces and the guides, respectively, and manually operable mechanisms for the guides, respectively, mounted on the columns, respectively, and operable independently of each other for adjusting the guides and constraining the guides in their adjusted position, and said manually operable mechanisms each being arranged for access by a workman while he is standing on said working floor level for operation from a single source to operate the wedge means and thereby adjust the guides.

WILLIAM W. CRILEY.